United States Patent [19]

Rohrbach et al.

[11] Patent Number: 5,713,971
[45] Date of Patent: Feb. 3, 1998

[54] FILTRATION DEVICE USING ABSORPTION FOR THE REMOVAL OF GAS PHASE CONTAMINANTS

[75] Inventors: Ronald P. Rohrbach, Flemington; Peter D. Unger, Convent Station, both of N.J.; Richard M. Sturgeon, Maumee, Ohio; Gordon W. Jones, Toledo, Ohio; Bijan Kheradi, Perrysburg, Ohio

[73] Assignee: AlliedSignal Inc., Morristown, N.J.

[21] Appl. No.: 736,308

[22] Filed: Oct. 24, 1996

Related U.S. Application Data

[63] Continuation of Ser. No. 363,500, Dec. 23, 1994, abandoned.

[51] Int. Cl.$^6$ ................................................. B01D 47/02
[52] U.S. Cl. ............................... 55/233; 55/234; 261/104
[58] Field of Search .......................... 261/104, 107, 261/DIG. 17, DIG. 65; 55/233, 234, 302, 303; 95/210–212; 210/634; 428/398

[56] References Cited

U.S. PATENT DOCUMENTS

| | | | |
|---|---|---|---|
| 1,273,682 | 7/1918 | Slater et al. | 261/104 |
| 2,085,390 | 6/1937 | Quinlivan | 261/104 |
| 2,603,468 | 7/1952 | Sutton | 261/104 |
| 2,653,017 | 9/1953 | Frost | 261/104 X |
| 3,505,175 | 4/1970 | Zalles | 261/80 X |
| 3,754,377 | 8/1973 | Clonts | 55/233 X |
| 3,888,955 | 6/1975 | Maruko | 261/104 X |
| 3,991,724 | 11/1976 | Geiser | 261/99 X |
| 4,031,180 | 6/1977 | Bohanon | 261/106 |
| 4,086,305 | 4/1978 | Dobritz | 261/104 X |
| 4,098,852 | 7/1978 | Christen et al. | 261/104 |
| 4,102,656 | 7/1978 | Koritz | 261/107 X |
| 4,130,487 | 12/1978 | Hunter et al. | 55/521 X |
| 4,166,087 | 8/1979 | Cline et al. | 261/DIG. 17 |
| 4,300,925 | 11/1981 | Nikandrov et al. | 55/233 X |
| 4,323,373 | 4/1982 | Fritz | 55/242 X |
| 4,578,091 | 3/1986 | Borja | 55/233 X |
| 4,774,032 | 9/1988 | Coates et al. | 261/104 |
| 4,938,787 | 7/1990 | Simmeriein-Erlbacher | 55/233 |
| 4,976,113 | 12/1990 | Gershuni et al. | 261/104 X |
| 5,024,686 | 6/1991 | Lerner | 55/259 |
| 5,057,368 | 10/1991 | Largman et al. | 428/397 |
| 5,110,325 | 5/1992 | Lerner | 55/233 X |
| 5,310,416 | 5/1994 | Borger et al. | 95/64 |
| 5,318,731 | 6/1994 | Yokoya et al. | 261/104 |
| 5,472,613 | 12/1995 | Schofield | 210/634 |

Primary Examiner—Richard L. Chiesa
Attorney, Agent, or Firm—Howard G. Massung

[57] ABSTRACT

A filter device and technique are described which rely on absorption rather than adsorption for the removal of gas phase contaminants. A filter media is composed of a plurality of wicking fibers each of which comprising a strand with a hollow region impregnated with any of a variety of liquid phase absorbing systems made from the combination of a carrier liquid and soluble complexing/degrading agent or agents. Each strand has a slot which connects the interior hollow region with an external surface. Capillary forces act on the carrier liquid such that the external surface is substantially dry and no appreciable adsorption of contaminates occurs on the external surface which would restrict the flow of an air stream through the filter media even after an extended period of use. The wicking fibers may be connected to an external reservoir which can be used to supply fresh absorbing fluid to the filter media giving them a potentially inexhaustible capacity. The filter media may be made from any of a variety of fibers which can rapidly transport a liquid phase by the nature of either their geometry or their chemical composition. Geometries may include multilobal cross-sectional configurations, porous hollow fibers, porous or striated fibers or tightly bundled microfibers, all of which exhibit the property of wicking fluid from an external source.

21 Claims, 3 Drawing Sheets

FILTRATION DEVICE USING ABSORPTION FOR THE REMOVAL OF GAS PHASE CONTAMINANTS

This application is a continuation of application Ser. No. 08/363,500 filed Dec. 23, 1994, now abandoned.

The present invention relates generally to methods and apparatus for removing undesirable particles from air and more especially to such methods and apparatus for removing odors from air which is recirculated in an enclosed human environment such as an automobile, airplane or similar cabin.

BACKGROUND OF THE INVENTION

The oil and intake air filters commonly encountered in conjunction with internal combustion engines are exemplary of the filtering art and its associated problems. These filters utilize a somewhat porous paper filter element or similar filter media on which any undesirable particles are retained as fluid is passed through such filter element or media. As filtering continues, the filter element or media becomes more and more blocked by the removed particles which results in a further reduction of the flow rate even though the particle removing efficiency increases. These filtering systems essentially rely on adsorption which is a surface phenomenon wherein the removed particles adhere to the surface of the filter element or media. Another example of an adsorptive particle removal technique, is the use activated charcoal or a zeolite material as an odor removing element or media to purify an air stream. However, such techniques or method of purifying an air stream are effective only for a relative short time period, are relatively inefficient at low odor concentration levels, and frequently result in a relatively high pressure differential across the element or media. As a result very large quantity of media is the only satisfactory way in which to use these materials however the relative large pressure differential problem would remain.

A costly and complex solution to the flow rate and efficiency problems can be provided by employing absorption techniques wherein a counterflowing liquid and gas are intermingled in a gas absorption tower with certain gas components being absorbed and removed by the liquid. Such "scrubbing" techniques are not suited to small solid filter applications since the interstices within the filter elements must be relatively large to avoid the liquid from clogging the filter elements and severely reducing air flow therethrough. These large openings significantly reduce the filtering efficiency.

An illustrative hybrid between the first two methods is shown in U.S. Pat. No. 4,323,373 which teaches an air cleaning system for a restaurant cooking grill wherein air is passed through filter elements which remove the undesirable materials and a scrubbing solution of water and detergent continuously circulates over the filter elements to remove congealed grease and other pollutants from those filter elements. Here, the filtering of particles from the air is an adsorption process, but the subsequent removal of the materials from the filter elements is an absorption process. This type system is relatively large and is adapted to high volume flow of relatively dirty air. While aptly suited to cooking grills, it is not well suited to more generalized odor removal functions. Also, as with the "scrubbers" mentioned above, the interstices within the filter elements must be relatively large to avoid the liquid from clogging the filter elements and severely reducing air flow therethrough.

It is desirable to provide a compact, economical absorptive air filter for the removal of odors which avoids the problems of reduced flow rates and reduced particle removing efficiency.

U.S. Pat. No. 5,057,368 entitled FILAMENTS HAVING TRILOBAL OR QUADRILOBAL CROSS-SECTIONS discloses a trilobal or quadrilobal fiber formed from thermoplastic polymers wherein the fiber has a cross-section comprised of a central core and three or four T-shaped lobes. The legs of each of the lobes intersect at the center of the core so that the angle between the legs of adjacent lobes is from about 80 to 130 degrees. The thermoplastic polymer is typically a nylon, a polyester, a polyolefin or a combination thereof. For example, a combination of a polyester such as polyethylene terephthalate and a polyolefin such as polypropylene may be used.

SUMMARY OF THE INVENTION

The present invention provides solutions to the above problems by providing a cabin air filtration system having structure forming a cavity with an air flow path therethrough. The cavity which has a liquid inlet and a liquid outlet, retains an internally wicking fibrous material through which fluid is transferred from the inlet to the outlet. An air-borne material absorbing liquid is supplied to the inlet and that air-borne material absorbing liquid and associated absorbed materials exits at the liquid outlet. Typically air is continuously circulated through the cavity from a cabin or room along a closed flow path consisting of the cavity and the cabin or room. Through experimentation it has been determined that extruded fibers such as disclosed in U.S. Pat. No. 5,057,368 are well suited to the practice of the present invention.

In accordance with another form the invention, the cavity includes a liquid reservoir which contains the air-borne material absorbing liquid. In this embodiment, the internally wicking fibrous material within the cavity draws liquid through capillary attraction from the reservoir into the air flow path without significantly restricting the air flow path.

In accordance with another aspect of the invention, undesirable materials are removed from an air stream by interposing a plurality of at least partially hollow wicking fibers in the air stream and supplying a liquid including a component having an affinity for the undesirable material to those wicking fibers at a location outside the air stream. The wicking fibers convey the liquid into contact with the air stream while maintaining relatively open interstices between the fibers so that the air stream flow is substantially unimpeded by the liquid. A concentration factor induced molecular migration effectively conveys the undesirable material in solution within the liquid away from the air stream.

BRIEF DESCRIPTION OF THE DRAWING

FIG. 1 is a view in cross-section of a cabin air filtration system wherein the filter cavity and associated liquid reservoir are common;

FIG. 2 is a view in cross-section of a cabin air filtration system wherein an air-borne material absorbing liquid is supplied to a filter cavity inlet and conveyed from a cavity outlet with cabin air circulated through the cavity;

FIG. 3 is a perspective view of an alternative filtration system cavity;

FIG. 4 is a view in cross-section of a modified cabin air filtration system wherein an absorbing liquid and associated absorbed materials are separated allowing the liquid to be returned for re-use; and FIG. 5 is a partial perspective view illustrative of a hollow wicking fiber suitable for use as an internally wicking fibrous material for use in the filtration systems illustrated in FIGS. 1, 2, 3 and 4.

DETAILED DESCRIPTION OF THE PREFERRED EMBODIMENTS

The present invention is particularly suited to freshening the air of a relatively small space such as the cockpit of an aircraft, interior of an automobile, spacecraft, building, or similar enclosed environment all of which are hereinafter generically identified as a cabin. Freshening of the air is achieved by removing particles or gas from an air stream flowing through the cabin.

Figure 1:
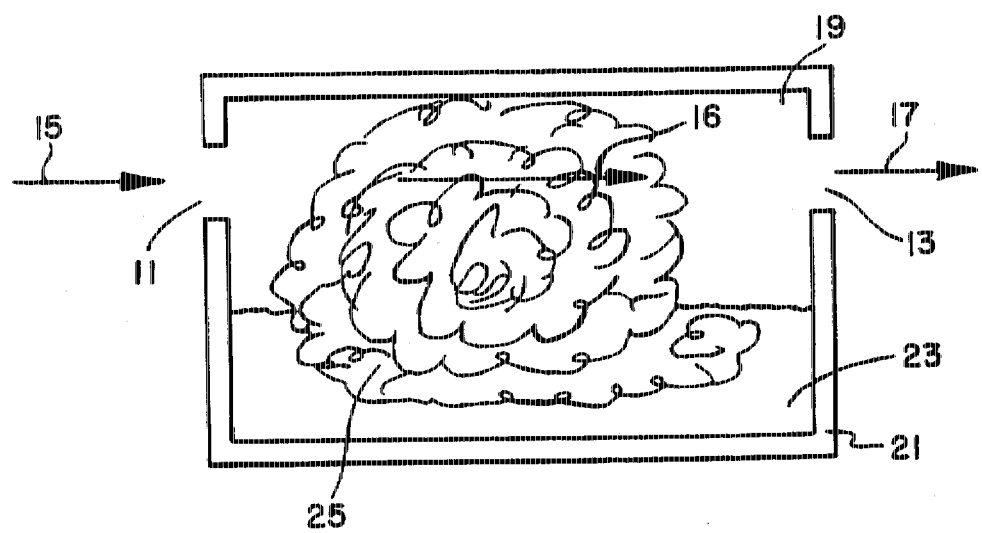

In FIG. 1, a cabin air filtration system according to the present invention has a housing 21 with a filter cavity 19 defined therein having an air inlet port 11 for receiving cabin air and an air outlet port 13 for returning that air to the cabin. Air flows from the cabin along a laminar flow path 15, 16, and 17. Housing 21 includes a liquid reservoir 23 located in a lower liquid-tight portion of the cavity 19. The reservoir 23 contains an air-borne material absorbing liquid typically comprising an inert carrier with one or more chemically aggressive agents dissolved therein. The inert carrier preferably is a non-volatile liquid such as glycerol, polyethylene glycol, and polypropylene glycol although water may be used in some applications. Chemically aggressive agents which have an affinity for the undesired air-borne materials are typically selected. The undesirable materials may merely be taken into solution, or there may be a chemical reaction with the undesirable material. For example, sodium hydroxide effectively removes carbon dioxide by converting it to sodium carbonate. Sodium hydroxide is also effective to remove hydrogen sulfide or formaldehyde. Calcium chloride or common table salt may be used as a desiccant. Acetic or citric acids have been found suitable for some other odors. The possible carriers and aggressive agents are nearly unlimited.

Figure 5:
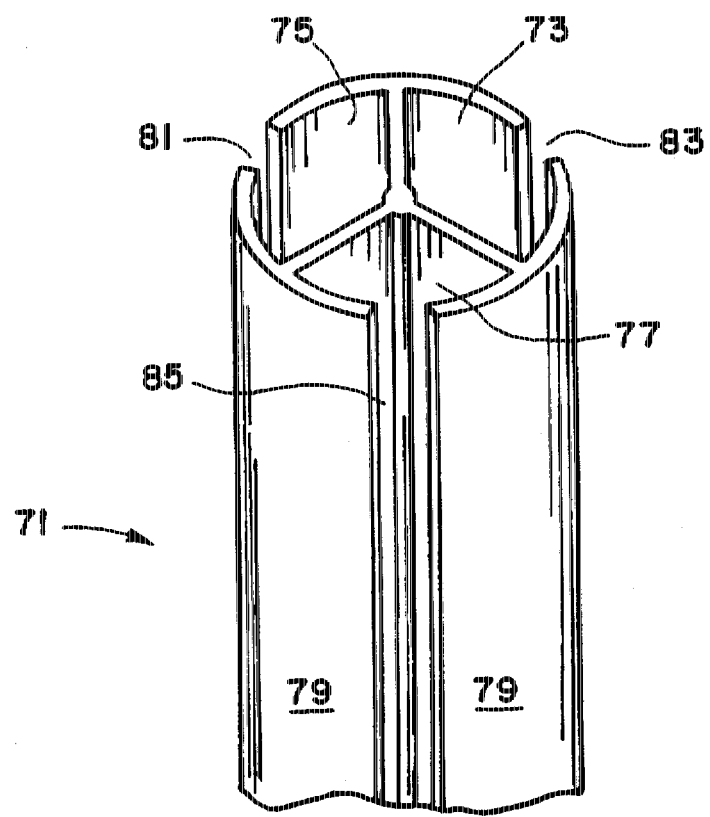

The cavity 19 also contains an internally wicking fibrous material 25 which functions by capillary action to move liquid upwardly from the reservoir into the air flow path without significantly restricting the air flow path. Many common materials which are effective wicking agents also restrict any attempt to circulate air through the material. For example, wetting a common handkerchief with water essentially seals the material against any air flow through it. By employing internally wicking materials where the capillary force inside individual fibers is far greater than that outside the fiber, the unrestricted air flow path about the outsides of the individual wicking fibers is maintained. Such an internally wicking fibrous material is sometimes formed of extruded strands having hollow interior regions which communicate with the outer strand surface. Strands of such a wicking fibrous material are illustrated in FIG. 5 as being C-shaped in cross-section or multi-lobed. A fan may be used to draw air from the cabin through the cavity 19 and back into the cabin.

Figure 2:
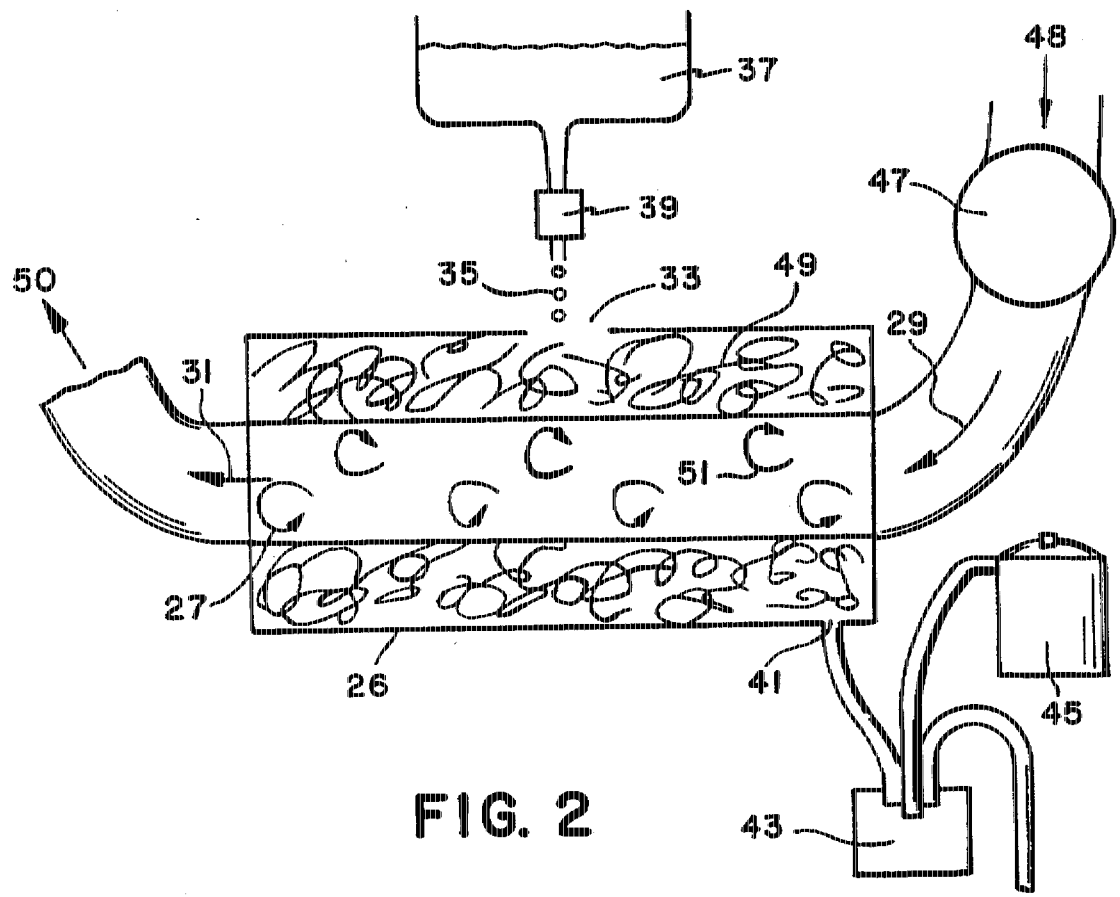

A system illustrated in FIG. 2 illustrates a closed loop cabin air filtration system to circulate air from the cabin, through the cavity 27 of a cylindrical housing 26 preferably along a laminar air flow path along arrows 29 and 31 from an inlet 48 and back into the cabin through an outlet 50. A liquid inlet port 33 receives an air-borne material absorbing liquid 35 from an external reservoir 37 as determined by flow control valve 39. The control of valve 39 may be timed to periodically release liquid, may be enabled only when an ignition switch is on, or otherwise controlled to limit liquid flow. Housing 26 has a liquid outlet port 41 for removing the air-borne material absorbing liquid and associated absorbed materials from the cavity 27 to, for example, a vehicle radiator 45 overflow tank 43. The internally wicking fibrous material 49 is generally annually disposed within the cavity 27 and transfers fluid from the inlet port 33 to a sump adjacent outlet port 41. Because the air flow path through the cavity is relatively long and narrow, turbulence may occur as illustrated by arrows 51 which can provide a mixing and may result in good exposure of the incoming air to the air-borne material absorbing liquid. An illustrative, fan 47 provides for circulation by drawing air through inlet 48 from a cabin, pushing this volume of air through the cavity 27 along the air flow path 29, 31 and back into the cabin through outlet 50.

Figure 3:
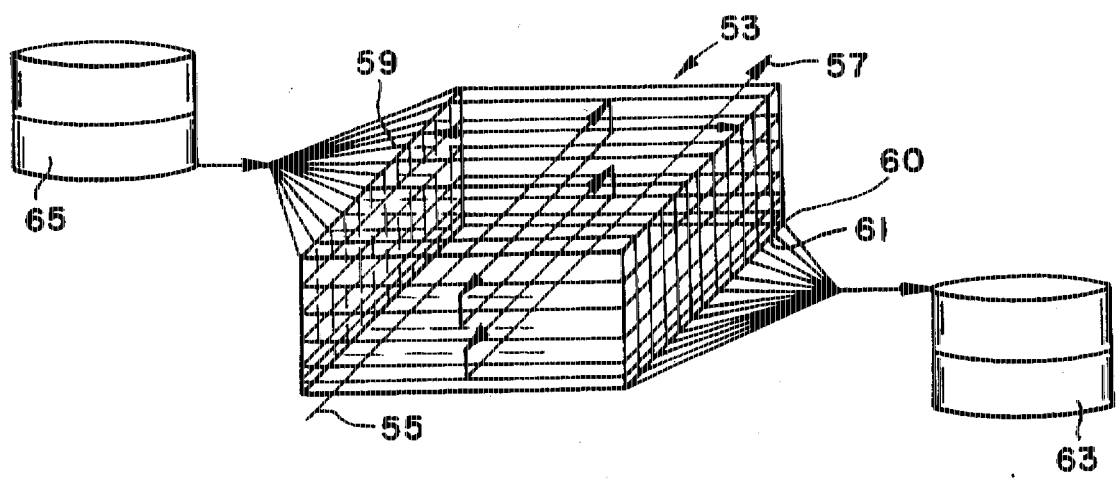

In FIG. 3, the housing for the cavity of the air filtration system is not shown, but such housing would surround the parallelepiped-shaped mass of wicking material 53. In this illustration, the fibrous wicking material has a plurality of generally parallel elongated fibers oriented to extend generally from left to right as viewed and in the intended direction of the flow path for fluid transfer. The air flow path for air is shown by arrows 55 and 57 and lies generally perpendicular to flow path for the liquid. A liquid inlet from reservoir 65 is provided near an upper edge 59 and a liquid outlet is provided near a sump 60 on a lower edge 61. The sump 60 communicates the cavity to a reservoir 63 for holding the air-borne material absorbing liquid.

One of the reservoirs may be eliminated from FIG. 3 to more nearly mimic the closed loop system described in conjunction with FIG. 1. In such a closed loop system the undesirable materials absorbed in the mass 53 will be effectively conveyed to the used solvent reservoir 63 by migration due to a concentration factor difference. However, periodic replacement of the fluid would then be necessary.

Figure 4:
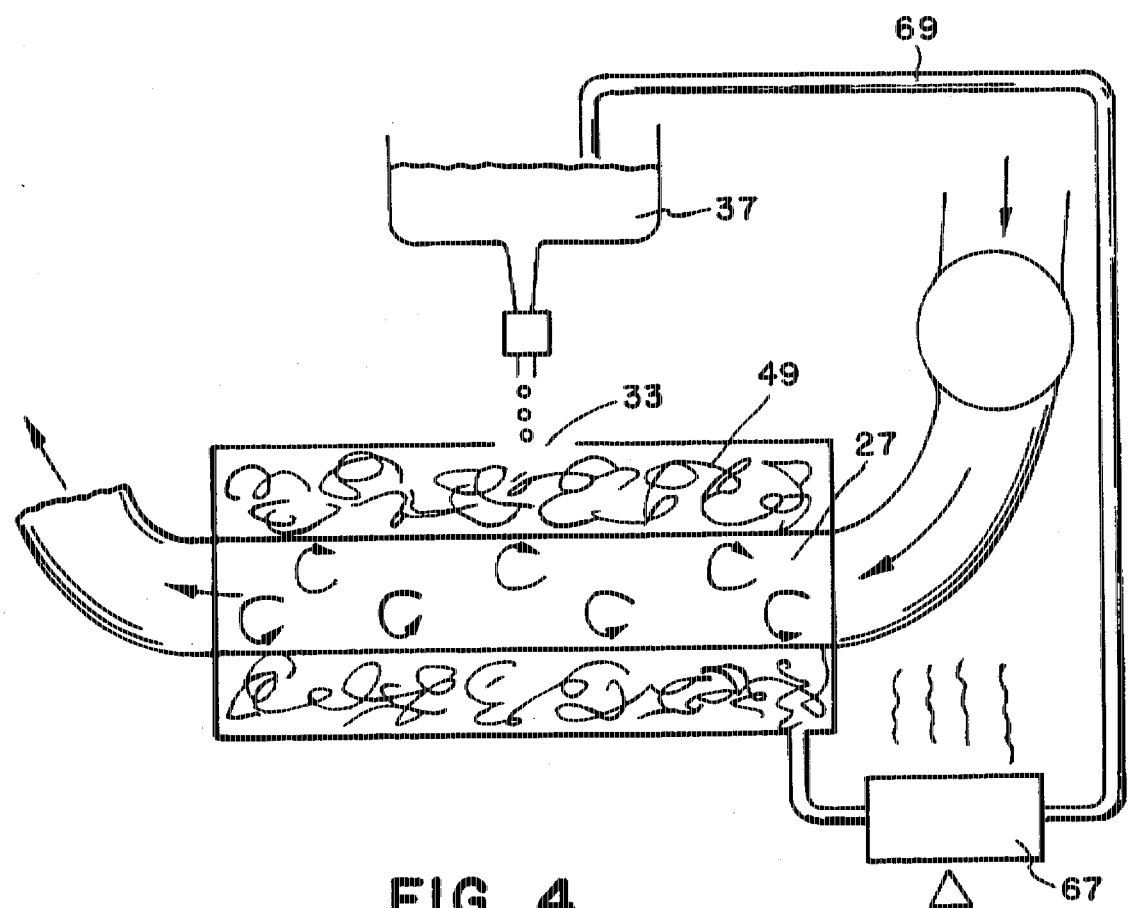

The system in FIG. 4, which is modification of the system of FIG. 2, illustrates structure which eliminates the need for periodic replacement of the fluid in reservoir 37. In this system, the air-borne absorbing liquid is regenerated by heating to drive off the noxious materials which were absorbed in the filter chamber 27. Here, the airborne material absorbing liquid and associated absorbed materials are received in vessel 67 and heated or otherwise treated to separate the absorbed materials from the liquid. As the noxious materials are removed, the liquid may be returned by conduit 69 to the supply reservoir 37 and ultimately is provided to the liquid inlet port 33 for re-use in cavity 27 by the wicking fibrous material 49.

As in FIG. 3, the reservoir 37 of FIG. 4 could be eliminated and filter cavity or chamber 27 would function as a material pick-up zone while vessel 67 constitutes a restoration zone with a non-mechanical migration of undesirable particles from one zone to the other.

The wicking fibrous material 71, as illustrated in FIG. 5, is formed as an extruded strand having three hollow interior regions 73, 75 and 77 each of which communicates with the outer strand surface 79,79' by way of generally parallel slots 81, 83 and 85. The capillary forces within the individual inner grooves 73, 75, and 77 are so much greater than those external to the fiber that liquid is readily wicked up the interior of the fiber without appreciable wetting of the external surface 79,79'. Thus, a mesh of such fibers 71 would remain unclogged even in the presence of a liquid and as a result this function is generally referred to as internally wicking. Such a fibrous material may be made of one or more materials such as nylons, polyesters, and polyolefins. The three T-shaped cross-section segments may have the outer portion of the T curved as shown, or straight. While the wicking fibrous material is depicted as three-lobed, any other numbers of lobes are possible. In addition, a C-shaped or other cross-sectional configurations may also be suitable for an internally wicking fiber for various applications.

The method of operation of the invention should now be clear. Undesirable material is removed from an air stream by interposing a plurality of at least partially hollow wicking fibers in the air stream and a liquid including a component having an affinity for the undesirable material is communicated through the wicking fibers as the air stream from an external location flows along an air path. In this way, the wicking fibers can convey material absorbing liquid into contact with the air stream while maintaining relatively open interstices between the fibers so that the air stream flow is substantially unimpeded by the liquid. The undesirable material in solution within the liquid may then be conveyed the from the air stream by a concentration factor induced molecular migration, by gravity, or may be removed and the liquid recirculated for repeated use.

What is claimed is:

1. A cabin air filtration system for removing gas phase contaminants comprising:

a cavity;

an air flow path through the cavity;

a liquid inlet into the cavity;

a liquid outlet from the cavity;

a fibrous wicking material having a plurality of elongated strands which are aligned to define a mesh within the cavity, said strands each having a hollow internal region extending longitudinally along said strand connected to an outer surface through at least one slot extending longitudinally along said strand, said hollow internal region transferring liquid from the inlet to the outlet along a path transverse to the air flow path;

means for supplying a gas absorbing liquid to the inlet;

means for conveying the gas absorbing liquid and any absorbed gases therein from the liquid outlet; and means for circulating air from a cabin, through said mesh along the air flow path, the cavity and back into the cabin, the gas phase contaminants being communicated to said gas absorbing liquid through said slot in said fiber wicking material whereby the gas phase contaminants are absorbed by said gas absorbing liquid retained in said hollow region without essentially affecting the air flow through said mesh.

2. The cabin air filtration system of claim 1 wherein the liquid inlet is higher than the liquid outlet so that liquid is communicated from the inlet to the outlet of each strand through natural migration.

3. The cabin air filtration system of claim 1 wherein said strands comprises a plurality of generally parallel elongated fibers oriented to extend generally in the direction of the liquid transfer path.

4. The cabin air filtration of claim 1 wherein the liquid transfer path and air flow path are generally orthogonal to one another.

5. The cabin air filtration system of claim 1 further including means for receiving the gas absorbing liquid and any absorbed gases from the means for conveying and for separating the absorbed gases from the liquid whereby the liquid may be returned to the liquid inlet for re-use.

6. The cabin air filtration system of claim 1 wherein capillary forces acting on said gas absorbing liquid retained in said hollow region of each strand prevents the gas absorbing liquid from being communicated from said fibrous wicking material to the outer surface of a strand.

7. The cabin air filtration system of claim 6 wherein the fibrous wicking material is made of at least one material selected from the group consisting of: nylons, polyesters, and polyolefins.

8. A cabin air filtration system for removing unwanted gases comprising:

a cavity;

a liquid reservoir;

a gas absorbing liquid within the reservoir;

an air flow path through the cavity;

an internally wicking fibrous material having a plurality of elongated strands which are aligned to define a mesh within the cavity, said strands each having a hollow internal region extending longitudinally along said strand connected to an outer surface through at least one radial opening extending longitudinally along said strand, said hollow internal region transferring said gas absorbing liquid along a path transverse to the air flow path within the cavity to move liquid from the reservoir into the air flow path without significantly restricting the air flow path as unwanted gases are absorbed by said gas absorbing liquid after passing through said radial openings; and means for circulating air from a cabin through the mesh in the cavity along the air flow path and back into the cabin.

9. The cabin air filtration system of claim 8 wherein the internally wicking fibrous material is formed of extruded strands having hollow interior regions which communicate with the outer strand surface.

10. The cabin air filtration system of claim 8 wherein the internally wicking fibrous material is made of at least one material selected from the group consisting of: nylons, polyesters, and polyolefins.

11. The cabin air filtration system of claim 8 wherein the liquid reservoir comprises a lower liquid-tight portion of the cavity.

12. A cabin air filtration system comprising:

a cavity;

an air flow path through the cavity;

a liquid inlet into the cavity;

a liquid outlet from the cavity;

an internally wicking fibrous material having a plurality of elongated strands which are aligned to define a mesh within the cavity, said strands each having a hollow internal region extending longitudinally along said strand connected to an outer surface through at least one longitudinal slot extending longitudinally along said strand, said hollow internal region transferring liquid from the inlet to the outlet without wetting said outer surface;

means for supplying an air-borne material absorbing liquid to the inlet;

means for conveying the air-borne material absorbing liquid and any absorbed materials therein from the liquid outlet; and means for freely circulating air from a cabin, through the cavity along the air flow path and back into the cabin without appreciable adsorption of air-borne material on said mesh, said air-borne material absorbing liquid absorbing of air-borne material communicated through said slot such that circulated air returned to said cabin is essentially free of said air-borne material.

13. The cabin air filtration system of claim 12 wherein the liquid comprises an inert carrier with a chemically aggressive agent dissolved therein.

14. The cabin air filtration system of claim 13 wherein the inert carrier is a non-volatile liquid selected from the group consisting of glycerol, polyethylene glycol, and polypropylene glycol.

15. The cabin air filtration system of claim 12 further including means for receiving the air-borne material absorbing liquid and absorbed materials from the means for conveying and for separating the absorbed materials from the liquid whereby the liquid may be returned to the liquid inlet for re-use.

16. The cabin air filtration system of claim 15 wherein the internally wicking fibrous material is made of at least one material selected from the group consisting of: nylons, polyesters, and polyolefins.

17. Apparatus for removing molecules from a fluid stream comprising:

a plurality of elongated fibers each having a longitudinally extending hollow internal cavity including an opening extending longitudinally along said fiber from the internal cavity to the outer fiber surface;

a liquid which can absorb the molecules disposed within the internal cavities of said plurality of elongated fibers;

a flow path for the fluid stream, containing the molecules to be removed, directed over a portion of said plurality of elongated fibers whereby the molecules to be removed are absorbed by said liquid; means for directing said fluid stream along said flow path and, removing means for removing the absorbed molecules from said liquid at a position on said plurality of elongated fibers displaced from said flow path.

18. Apparatus as claimed in claim 17 wherein the longitudinally extending internal cavity in each of said plurality of elongated fibers is sized so that said liquid is retained within the cavity by capillary forces.

19. Apparatus as claimed in claim 17 wherein the molecules to be removed which are absorbed by said liquid are moved from said flow path to said removing means by a concentration factor induced molecular migration which effectively conveys the absorbed molecules away from the fluid stream.

20. Apparatus as claimed in claim 17 wherein the fluid stream is air.

21. Apparatus as claimed in claim 17 wherein a plurality of internal cavities, each including an opening to the outer fiber surface, are formed in each fiber.

\* \* \* \* \*